3,177,172
METHOD FOR THE PREPARATION OF LATEXES OF SYNTHETIC RESINS AND FOR THE CONTROL OF THE VISCOSITY OF SUCH LATEXES
Jack J. Adams, Midland, Mich., assignor to The Dow Chemical Company, Midland, Mich., a corporation of Delaware
No Drawing. Filed Oct. 6, 1960, Ser. No. 60,796
10 Claims. (Cl. 260—29.6)

This invention relates to an improved method for the preparation of synthetic resin latexes. More particularly, it relates to a method for the preparation of certain synthetic resin latexes in a manner that permits control over the viscosity of the latex produced. Specifically, it relates to a method for the production of latexes which contain, as the disperse phase thereof, polymers of relatively water soluble, ethylenically unsaturated materials and copolymers of such materials and other ethylenically unsaturated materials copolymerizable therewith.

It has been known heretofore that synthetic resins containing an extremely low content of water extractable material can be obtained by the emulsion polymerization of a desired monomer or mixture of monomers when the emulsifying agent in the preparation of the latex is itself capable of entering into the polymerization reaction. In other words, the emulsifying agent is comonomeric with the monomer system and becomes an integral part of the polymer formed.

Synthetic resin latexes prepared with a water soluble, comonomeric emulsifying agent find application in the manufacture of latex base paint since, by virtue of their low content of water extractable material, the dry paint film is resistant to water spotting and to swelling due to moisture absorption. Such latexes also find use in the preparation of films and of impregnated paper and the like for use in the packaging of foodstuffs. In this application, the absence of free, residual emulsifying agent minimizes the possibility of changes in the taste and odor of the packaged material.

The preparation of certain latexes in the presence of water soluble, comonomeric emulsifying agents is, however, attended by difficulties. Thus, if in the monomer system employed there is present a relatively water soluble material such as acrylonitrile or a lower alkyl acrylate, the resulting latex will generally tend to be of a relatively high viscosity. This fact can seriously impair the value of the latex for a given application and adjustment of viscosity by dilution is generally impractical. A latex of relatively low viscosity and of a practically high content of the disperse phase is the obvious desideratum.

It is therefore the principal object of the invention to provide a method for the emulsion polymerization of ethylenically unsaturated monomers and mixtures of such monomers whereby control may be exercised over the viscosity of the resulting latex. It is more specifically an object of the invention to provide such a method that is applicable to the emulsion polymerization of a monomeric mixture containing a relatively water soluble monomer. Other and related objects will become apparent from the following description of the invention.

Frequently, in order to minimize the quantity of emulsifying agent necessary in the preparation of a latex, the technique of seed polymerization is employed. In this technique a dilute latex is first prepared using a relatively small amount of the monomer charge desired. The particles constituting the disperse phase of this dilute latex function as sites for the polymerization of the balance of the monomer charge subsequently added. Advantageously, about 10 percent of the monomer charge may be first polymerized to form the dilute seed latex.

It has now been found that the viscosity of the final latex can readily be controlled through modification of the polymer constituting the disperse phase of the seed latex, in such a polymerization system. More specifically, it has been discovered that control of the viscosity can be achieved by the replacement of all or part of the relatively water soluble monomer in the initial polymerization step by an alkyl acrylate which contains at least four carbon atoms in the alkyl group. Since the seed polymer accounts for only a relatively small fraction of the total weight of polymer in the final product, no major change in polymer composition is required in order to effect the desired control in viscosity. In other words, quite wide variations in viscosity may be readily achieved by introducing only minor variations in overall polymer composition.

As indicated above, the method of the invention has application in the preparation of latexes of synthetic resins resulting from the polymerization of relatively water soluble, ethylenically unsaturated monomers and of mixtures of these stated monomers with other materials copolymerizable therewith. As herein employed the term relatively water soluble ethylenically unsaturated monomers is intended to embrace acrylonitrile and the methyl and ethyl esters of acrylic acid.

A wide variety of materials can, of course, be readily copolymerized with the above mentioned monomers. Of particular interest and value in the ultimate production of thin films for packaging use are, of course, vinylidene chloride, vinyl chloride and styrene. The nature of the comonomer, however, is not significant. The method of the invention is primarily directed to obviating the difficulties encountered, in regard to the development of latexes of excessively high viscosities, when preparing a latex from a monomer charge that includes one or more of the relatively water soluble monomers previously mentioned.

While the nature of the comonomer is not a critical consideration, the relative amounts of soluble monomer and comonomer to be employed must be taken into account. When the soluble monomer constitutes less than about 5 percent by weight of the desired monomer charge, the resulting latex does not generally exhibit an excessively high viscosity and the method accordingly has limited application. Above this value for the concentration of the relatively soluble monomer in the desired monomer charge, the latex produced therefrom tends to become undesirably viscous, generally becoming increasingly so as the amount of relatively soluble monomer in the charge increases. Accordingly, the method of the invention finds application in the preparation of latexes, the disperse phase of which contains at least about 5 percent by weight, preferably from about 10 to about 40 percent, of one or more of the group consisting of acrylonitrile, methyl acrylate and ethyl acrylate.

A variety of materials are available that are suitable to function as emulsifying agents and adapted to use in the practice of the present invention. These materials, of course, must be water soluble and capable of copolymerizing with the monomer or mixture of monomers in question so as to form part of the resulting final polymer. Of particular usefulness are the aminoalkyl and sulfoalkyl esters of acrylic and methacrylic acids. These materials are, of course, salt forming and will exist in the aqueous polymerization medium either as salts or in their free state depending on the pH of the medium. Examples of suitable materials include aminoethyl acrylate, 2-sulfoethyl acrylate and 2-dimethylaminoethyl methacrylate. The choice of the material to be employed will be readily apparent to those skilled in the art, as will the determination of the amount to be employed. Usually, an amount equal to from about 0.5 percent to about 2.5 percent of the final total weight of monomer will be preferred.

As indicated above, the monomer charge in the preparation of the seed latex will ordinarily constitute about 10 percent by weight or more of the total weight of monomers employed. However, if desired, it may represent as little as 5 percent of this total weight. The initial polymerization is carried out in the known manner, all of the comonomeric material that functions as an emulsifying agent being present during this step. The composition of the monomer charge will depend on the composition of the main monomer charge later to be introduced and on the viscosity desired in the final product. Generally, the concentration of the non-soluble comonomer (e.g. styrene) will be the same as in the main monomer charge, and the relatively water soluble monomer (e.g. methyl acrylate) will be replaced in whole or in part by an alkyl acrylate containing at least four carbon atoms in the alkyl group.

When the preparation of the seed latex is completed, the main monomer charge is added to the seed latex and the final polymerization is carried out to give the desired latex.

In both of the above described polymerization reactions water soluble, free-radical catalysts are employed in the manner well known to the art. Of these materials, hydrogen peroxide is to be preferred since its decomposition does not give rise to water extractable residues. However, other catalysts such as the ammonium and alkali metal persulfates may be advantageously employed.

The invention is further illustrated by the following examples which are intended to be merely demonstrative and not limiting and wherein, unless otherwise indicated, all parts and percentages are to be taken on a weight basis.

EXAMPLE 1

A mixture of 200 parts of distilled water, 2.0 parts of aminoethyl acrylate, 1.0 part of hydrogen peroxide and 5 p.p.m. of ferrous nitrate, based on the ultimate total weight of monomers used, was placed in a glass bottle capable of being tightly capped. The bottle was placed in a freezing bath until the contents were frozen. The air was then flushed from the bottle with a stream of nitrogen, after which 3.0 parts of ethyl acrylate were added. Seven parts of vinylidene chloride were added by distillation and the bottle was then sealed. It was placed in a water bath maintained at a temperature of 45° C. and subjected to a shaking action for one hour. At the end of this period the bottle was removed and again placed in a freezing bath until the contents were frozen. The bottle was then opened and 27.0 parts of ethyl acrylate were added. The bottle was flushed with nitrogen and 63.0 parts of vinylidene chloride were added by distillation. The bottle was again sealed and placed in the constant temperature water bath where it was subjected to a shaking action for 8 hours. At the end of this period the bottle was removed and allowed to cool to room temperature before being opened. A thick, pasty latex was obtained, the viscosity of which, measured on a Brookfield viscometer, was 24,800 c.p.s.

EXAMPLE 2

A latex was prepared in a manner similar to that of Example 1 but employing as the first monomer charge the following: 2.3 parts of ethyl acrylate, 0.7 part of butyl acrylate and 7.0 parts of vinylidene chloride. A thick latex was obtained which exhibited a viscosity of 9,850 c.p.s.

EXAMPLE 3

A latex was prepared in a manner similar to that of Example 1 but employing as the first monomer charge a mixture of 3.0 parts of butyl acrylate and 7.0 parts of vinylidene chloride. A fluid latex was obtained which exhibited a viscosity of 110 c.p.s.

EXAMPLE 4

A series of latexes was prepared from a main monomer charge of a mixture of acrylonitrile and vinylidene chloride and seed latexes of varying compositions. The results are summarized in Table 1, below, being designated 4–a, 4–b and 4–c respectively.

EXAMPLE 5

A series of latexes was prepared from a main monomer charge of a mixture of ethyl acrylate and styrene and seed latexes of varying compositions. The results are summarized in Table 1, below, being designated 5–a, 5–b and 5–c, respectively.

Table 1

| Example No. | Main Monomer Charge, Parts | Seed Latex Monomer Charge, Parts | Viscosity of Latex, c.p.s. |
|---|---|---|---|
| 1 | 27 Ethyl acrylate / 63 Vinylidene chloride | 3.0 Ethyl acrylate / 7.0 Vinylidene chloride | 24,800 |
| 2 | 27 Ethyl Acrylate / 63 Vinylidene chloride | 2.3 Ethyl acrylate / 0.7 Butyl acrylate / 7.0 Vinylidene chloride | 9,850 |
| 3 | 27 Ethyl acrylate / 63 Vinylidene chloride | 3.0 Butyl acrylate / 7.0 Vinylidene chloride | 110 |
| 4–a | 27 Acrylonitrile / 63 Vinylidene chloride | 3.0 Acrylonitrile / 7.0 Vinylidene chloride | 7,500 |
| 4–b | 27 Acrylonitrile / 63 Vinylidene chloride | 2.3 Acrylonitrile / 0.7 Butyl acrylate / 7.0 Vinylidene chloride | 2,920 |
| 4–c | 27 Acrylonitrile / 63 Vinylidene chloride | 3.0 Butyl acrylate / 7.0 Vinylidene chloride | 50 |
| 5–a | 27 Ethyl acrylate / 63 Styrene | 3.0 Ethyl acrylate / 7.0 Styrene | 4,000 |
| 5–b | 27 Ethyl acrylate / 63 Styrene | 2.3 Ethyl acrylate / 0.7 Butyl acrylate / 7.0 Styrene | 1,270 |
| 5–c | 27 Ethyl acrylate / 63 Styrene | 3.0 Butyl acrylate / 7.0 Styrene | 34 |

The marked reduction of the viscosity of the latex as a consequencee of the replacement of the relatively water soluble monomer in the seed latex monomer charge by the butyl acrylate is immediately evident.

EXAMPLE 6

A mixture of 200 parts of distilled water, 2.0 parts of 2-sulfoethyl methacrylate, 0.5 part of potassium persulfate and 0.3 part of sodium bisulfite was placed in a glass bottle which was then placed in a freezing bath until the contents were frozen. The air was then flushed from the bottle with a stream of nitrogen, after which 3.0 parts of acrylonitrile were added. Seven parts of vinylidene chloride were added by distillation and the bottle was sealed. It was placed in a water bath maintained at a temperature of 45° C. and subjected to a shaking action for one hour. Thereafter the bottle was removed and again placed in a freezing bath until the contents were frozen. It was then opened and 27.0 parts of acrylonitrile were added. The bottle was flushed with nitrogen and 63.0 parts of vinylidene chloride were added by distillation into the bottle. The bottle was again sealed and placed in the constant temperature bath at a temperature of 45° C. and subjected to a shaking action for 8 hours. At the end of this period the bottle was removed, allowed to cool to room temperature, and opened. A pasty, non-pourable material was obtained.

EXAMPLE 7

A latex was prepared in a manner similar to that of Example 6 but employing as a first monomer charge a mixture of 3.0 parts of butyl acrylate and 7.0 parts of vinylidene chloride. A stable, fluid latex was obtained.

EXAMPLE 8

A latex was prepared in a manner similar to that of Example 6 with the substitution of 2.0 parts of 2-dimethyl-aminoethyl methacrylate for the 2-sulfoethyl-methacrylate employed therein. An extremely viscous latex was obtained.

EXAMPLE 9

A latex was prepared in a manner similar to that of Example 7 with the substitution of 2.0 parts of 2-dimethylaminoethyl methacrylate for the 2-sulfoethyl methacrylate employed in that example. A very fluid, stable latex resulted.

What is claimed is:
1. A method for the preparation of a latex of controlled viscosity, said latex being derived from the emulsion polymerization of a polymerizable mixture (A) consisting of at least one monomer (a) selected from the group consisting of acrylonitrile, methyl acrylate and ethyl acrylate, and at least one other monomer copolymerizable therewith, said method comprising employing as the aqueous phase for the said emulsion polymerization of mixture (A) a latex obtained from a first emulsion polymerization of a polymerizable mixture (B) derived from polymerizable mixture (A) by the substitution therein for at least about 25 percent of monomer (a) of an alkyl acrylate containing at least four carbon atoms in the alkyl group, said first emulsion polymerization of polymerizable mixture (B) being carried out in the presence of a minor amount of a water soluble ester selected from the group consisting of the aminoalkyl and sulfoalkyl esters of an acid selected from the group consisting of acrylic acid and methacrylic acid.

2. A method for the preparation of a latex of controlled viscosity, said latex being derived from the emulsion polymerization of a polymerizable mixture (A) consisting of at least one monomer (a) selected from the group consisting of acrylonitrile, methyl acrylate and ethyl acrylate, and at least one other monomer copolymerizable therewith, said method comprising employing as the aqueous phase for the said emulsion polymerization of mixture (A) a latex obtained from a first emulsion polymerization of an amount equal to at least about 5 percent by weight of the weight of mixture (A) of a polymerizable mixture (B) derived from polymerizable mixture (A) by the substitution therein for at least about 25 percent of monomer (a) of an alkyl acrylate containing at least four carbon atoms in the alkyl group, said first emulsion polymerization of polymerizable mixture (B) being carried out in the presence of a minor amount of a water soluble ester selected from the group consisting of the aminoalkyl and sulfoalkyl esters of an acid selected from the group consisting of acrylic acid and methacrylic acid.

3. A method for the preparation of a latex of controlled viscosity, said latex being derived from the emulsion polymerization of a polymerizable mixture (A) consisting of at least one monomer (a) selected from the group consisting of acrylonitrile, methyl acrylate and ethyl acrylate, and at least one other monomer copolymerizable therewith, said monomer (a) constituting from about 5 percent to about 40 percent by weight of the weight of said polymerizable mixture (A), said method comprising employing as the aqueous phase for the said emulsion polymerization of mixture (A) a latex obtained from a first emulsion polymerization of an amount equal to at least about 5 percent by weight of the weight of mixture (A) of a polymerizable mixture (B) derived from polymerizable mixture (A) by the substitution therein for at least about 25 percent of monomer (a) of an alkyl acrylate containing at least four carbon atoms in the alkyl group, said first emulsion polymerization of polymerizable mixture (B) being carried out in the presence of a minor amount of a water soluble ester selected from the group consisting of the aminoalkyl and sulfoalkyl esters of an acid selected from the group consisting of acrylic acid and methacrylic acid.

4. The method according to claim 3 wherein the alkyl acrylate is butyl acrylate.

5. A method for the preparation of a latex of controlled viscosity, said latex being derived from the emulsion polymerization of a polymerizable mixture (A) consisting of at least one monomer (a) selected from the group consisting of acrylonitrile, methyl acrylate and ethyl acrylate, and at least one other monomer copolymerizable therewith, said monomer (a) constituting from about 5 percent to about 40 percent by weight of the weight of said polymerizable mixture (A), said method comprising employing as the aqueous phase for the said emulsion polymerization of mixture (A) a latex obtained from a first emulsion polymerization of an amount equal to at least about 5 percent by weight of the weight of mixture (A) of a polymerizable mixture (B) derived from polymerizable mixture (A) by the substitution therein for at least about 25 percent of monomer (a) of an alkyl acrylate containing at least four carbon atoms in the alkyl group, said first emulsion polymerization of polymerizable mixture (B) being carried out in the presence of from about 0.5 percent to about 2.5 percent by weight, based on the combined total weight of polymerizable mixture (A) and polymerizable mixture (B), of a water soluble ester selected from the group consisting of the aminoalkyl and sulfoalkyl esters of an acid selected from the group consisting of acrylic acid and methacrylic acid.

6. A method according to claim 4 wherein the water soluble ester is aminoethyl acrylate.

7. A method according to claim 4 wherein the water soluble ester is 2-sulfoethyl methacrylate.

8. A method according to claim 4 wherein the water soluble ester is 2-dimethylaminoethyl methacrylate.

9. The method according to claim 5 wherein the monomer copolymerizable with monomer (a) in polymerizable mixture (A) is styrene.

10. The method according to claim 5 wherein the monomer copolymerizable with monomer (a) in polymerizable mixture (A) is vinylidene chloride.

References Cited by the Examiner
UNITED STATES PATENTS 2,894,927    7/59    Elder et al. _____ 260—29.6
2,914,499    11/59   Sheetz _____ 260—79.3

LEON J. BERCOVITZ, *Primary Examiner.*

D. ARNOLD, *Examiner.*